Jan. 14, 1930.  E. J. MURPHY  1,743,794
MEANS FOR REPRODUCING POSITION
Filed June 8, 1927
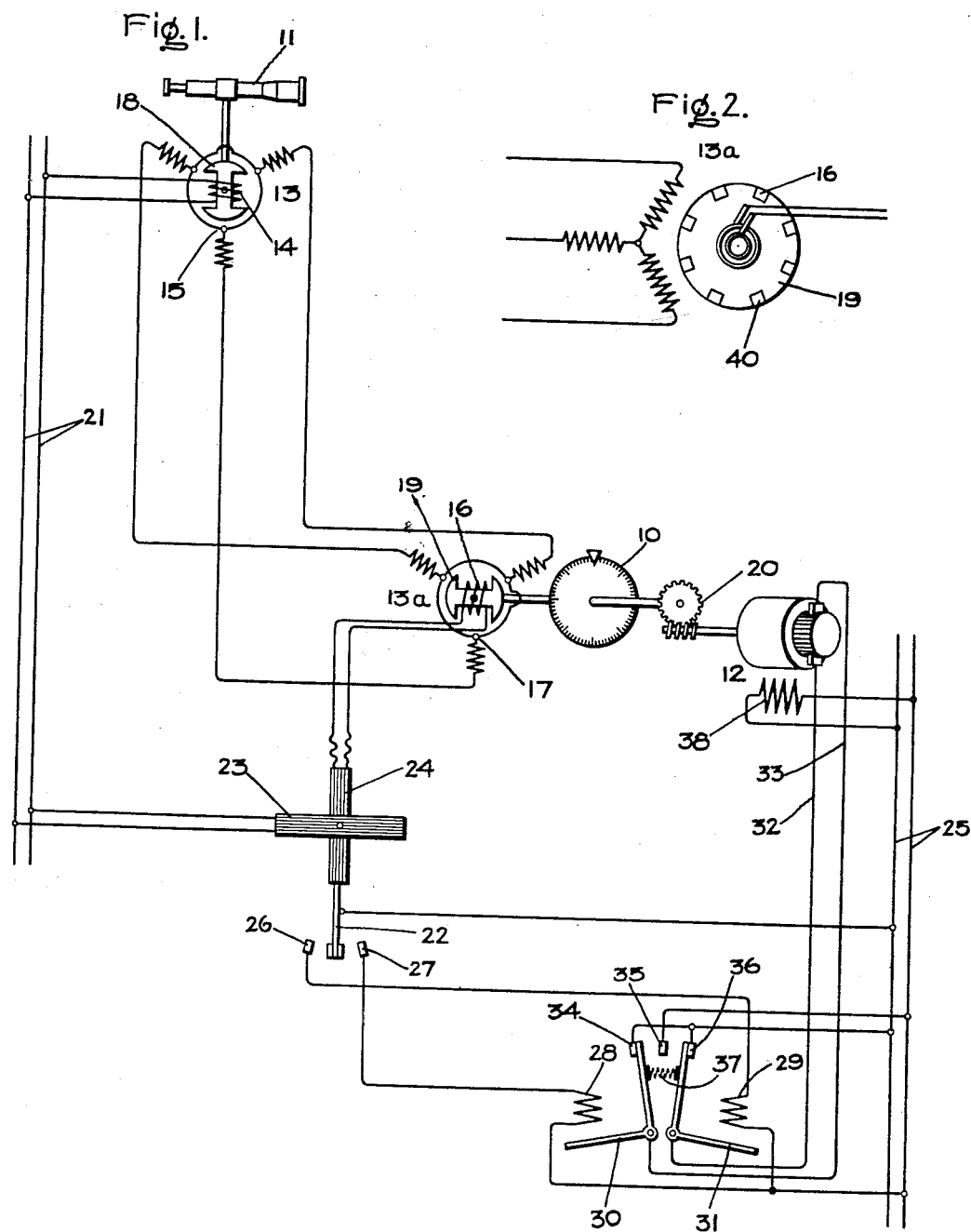
Inventor:
Edwin J. Murphy,
by
His Attorney.

Patented Jan. 14, 1930

1,743,794

UNITED STATES PATENT OFFICE

EDWIN J. MURPHY, OF SCHENECTADY, NEW YORK, ASSIGNOR TO GENERAL ELECTRIC COMPANY, A CORPORATION OF NEW YORK

MEANS FOR REPRODUCING POSITION

Application filed June 8, 1927. Serial No. 197,503.

My invention relates to means for reproducing position and has for its object the provision of improved means for maintaining an object in positional agreement with a controlling object.

More specifically my invention relates to systems for driving an object into positional agreement with a remote controlling object of the type in which the driven object is actuated by an electric motor which is controlled by the controlling object through the agency of suitable remote control means. My invention is particularly useful in reproducing, at a distance, the position of an object having angular motion, such as a telescope.

In carrying out my invention, I provide means for producing an electromotive force which is substantially proportional in amount and direction to any positional disagreement between the two objects, together with means responsive to this electromotive force for controlling the driving motor for the driven object.

For a more complete understanding of my invention reference should be had to the accompanying drawing, Fig. 1 of which is a diagrammatic representation of a system for reproducing position embodying my invention; while Fig. 2 is a diagrammatic view of means for generating an electromotive force.

Referring to the drawing, I have shown my invention in one form as applied to the driving of a position indicator dial 10 constituting the driven object, so as to maintain the dial automatically in angular agreement with a remotely situated telescope or sighting device 11 constituting a controlling object. The dial 10 is driven by an electric motor 12 of suitable type shown as a direct current motor. The motor 12 is controlled in accordance with the angular displacement between the dial and the telescope in such a manner that upon angular movement of the telescope in a horizontal plane the motor is energized to drive the dial in a corresponding direction, and when the telescope is brought to rest the dial is brought to rest in angular agreement therewith.

The angular movements of the telescope are transmitted and reproduced for the control of the motor in terms of an electromotive force, this being effected by means of an electrical instrument 13 driven by the telescope which is electrically connected to a similar instrument 13ª in the vicinity of the motor. The instruments 13 and 13ª are of a type often used to transmit angular motion, the instrument 13 being provided with a field winding 14 and with a polycircuit armature winding 15 shown as physically similar to a three-phase delta connected winding, while the instrument 13ª is provided with similar windings 16 and 17. As shown, the field winding of each instrument is mounted on a rotor element. The rotor 18 of the instrument 13 is connected to the telescope so as to be driven thereby in a suitable ratio. As shown, the rotor 18 is directly connected to the telescope so as to be operated in a 1:1 ratio therewith in accordance with its movements in a horizontal plane. The rotor 19 of the instrument 13ª is connected to the dial 10 in a 1:1 ratio therewith so as to have the same movement as the dial. A suitable speed reduction gearing 20 is provided between the motor 12 and the dial.

The armature windings 15 and 17 are electrically connected together, like points of the two windings being interconnected, while the field winding 14 is energized from a suitable alternating current source of supply 21. The field winding 16 is electrically connected to a suitable relay provided with a contact arm 22 for controlling the circuit of the motor. This relay may be of any suitable form and as shown comprises a stationary magnet coil 23 which is electrically connected to the supply source 21 and a rotatably mounted coil 24 carrying the contact arm 22. A suitable direct current source of supply 25 is provided for the motor and the contact arm 22 is connected to one side of this source. On opposite sides of the contact arm are contacts 26 and 27 with one or the other of which the contact arm is adapted to engage. These contacts are connected to one terminal each of the coils 28 and 29 respectively, the remaining terminal of each coil being connected to the side of the supply source 25 opposite from the contact arm. Actuated by the coils 28 and 29 respectively are pivoted bell crank switch arms 30 and 31 which directly open and close the circuit of the motor. As shown, the two switch arms are connected through conductors 32 and 33 directly to the armature terminals of the motor and they are arranged to cooperate with stationary contacts 34, 35 and 36. When the coils 28 and 29 are deenergized the contact arms are biased away from each other by a helical spring 37 into engagement with the contacts 34 and 36 which are electrically connected together whereby the armature of the motor is short circuited for dynamic braking. Upon energization of one or the other of the coils, one or the other of the switch arms, as the case may be, is moved about its pivot into engagement with the central contact 35 whereby the armature of the motor is connected across the supply source 25 with such polarity as to give the desired direction of rotation. The field 38 of the motor is directly connected across the supply source 25.

In the operation of the system, it will be observed that the field winding 14 will induce electromotive forces in its armature winding 15, the value and direction of the electromotive force in each circuit of the winding being dependent upon the angular position of the field winding. These electromotive forces are impressed on the armature winding 17 which thereby produces an alternating electromagnetic field in the instrument 13 which has an angular direction corresponding to the direction of the field of the winding 14. Upon movement of the telescope in a horizontal plane the field winding 14 being given a like rotation induces a different set of electromotive forces in its armature winding which are impressed on the armature winding 17 and as a result of this the field of the armature winding 17 has the same angular movement as the field of winding 14.

This field set up by the armature winding 17 tends to induce voltages in the winding 16 inductively related therewith, which voltages are impressed on the coil 24. When the winding 16 is turned to such position that its axis is at right angles to this field, i. e., a position of 90° displacement with respect to the winding 14, no voltage is induced in it. Under these conditions the coil 24 is short circuited through the field winding 16, and therefore takes up a position with its axis at right angles to the axis of the coil 23, as shown in the drawing. Under these conditions the contact arm 22 stands midway between its cooperating contacts and the driving motor 12 is therefore deenergized. The adjustment of the system is such that at this time the dial 10 is in angular agreement with the telescope.

Any movement of the telescope, however, produces an electromotive force in the coil 16, as will be understood from the previous description, and this electromotive force is impressed on the coil 24 which is thereby caused to move the contact arm 22 in one direction or the other depending upon the direction of the induced electromotive force as compared with the direction of the voltage impressed on the coil 23 from the source 21. Assuming for example that the two voltages are in phase and that the contact arm 22 is thereby moved into engagement with the contact 26, the coil 29 will be energized to close the circuit of the motor in such direction that the motor will drive the dial in the same direction as the telescope is being turned. The dial will be thus driven to follow the telescope with a slight lag necessary for the control of the motor and when the telescope is brought to rest the dial will be brought to rest in angular agreement therewith by movement of the coil 16 to a zero voltage position whereby the coil 29 is deenergized. The armature of the motor is then short circuited through the switch arms 30 and 31 to bring the motor quickly to rest by dynamic braking.

In case the telescope is moved in the opposite direction the electromotive force induced in the coil 16 will be displaced 180° in phase relation with respect to the electromotive impressed on the coil 23 and consequently the contact arm 22 will be moved in the opposite direction to engage the contact 27 whereby the coil 28 is energized to start the motor in the opposite direction. The motor will continue to operate until the dial is brought to rest in angular agreement with the telescope, as will be understood from the previous description.

It will be observed that there are two positions 180° apart in which the coil 16 has zero voltage induced in it. Only one of these positions however is a true zero position in which the dial is in angular agreement with the telescope. In the true zero position the conditions are stable so that when the winding is not in this position due to displacement of the field of its armature winding, or any other cause, it will be immediately turned to the zero position by the operation of the motor. In the other position of zero voltage however the conditions are unstable so that it would be practically impossible for the motor to come to rest with the field winding in this position, since it will be observed that any movement of the winding from that position affects the control of the motor so as to drive the winding 180° in one direction or the other to the true zero position.

As shown in Fig. 2, the rotor 19 of the instrument 13ª is preferably made up of circular laminations provided with slots 40 uniformly spaced around their peripheries. The field winding 16 is wound in these slots. With this arrangement a uniform air gap is provided regardless of the position of the rotor and consequently the impedance of the instrument 13ª is more nearly uniform. In other words, the impedance does not vary appreciably with the position of the rotor, as would occur with the salient pole rotor shown in Fig. 1.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. Means for reproducing position comprising in combination with a controlling object a driven object remote from said controlling object, means including an alternating current supply source for producing an alternating magnetic field rotating in accordance with the movements of said controlling object, a coil inductively associated with said field in which electromotive forces are induced by said field varying in value and direction in accordance with the amount and direction of the angular disagreement between said objects, a driving motor for said driven object, and control means for said motor comprising two inductively cooperating coils energized by the electromotive force of said supply source and said first coil respectively whereby said motor is caused to drive the driven object into angular agreement with the controlling object, and means for changing the angular relation of said field and said coil in accordance with the rotation of said driven object.

2. Means for reproducing position comprising in combination with a controlling object and a driven object remote from said controlling object, means including an alternating current source of supply for producing an alternating current field rotating in accordance with the movements of said controlling object, a control coil inductively associated with said field in which electromotive forces are induced by said field varying in value and direction in accordance with the amount and direction of the angular disagreement between said objects, a driving motor for said driven object, a control device for said motor, operating means for said control device including two inductively cooperating coils, connections between one of said coils and said supply source, and connections between the other of said coils and said control coil whereby said control device is actuated to cause the motor to drive the driven object into angular agreement with the controlling object.

3. Means for reproducing position comprising in combination with a controlling object and a driven object, an inductive device provided with polycircuit armature and single circuit field windings, one of said windings being rotatably mounted, a driving connection between said controlling object and said rotatable winding, a source of alternating current supply for said field winding, a second inductive device provided with similar windings, a driving connection between said driven object and the rotatable winding of said second device, electrical connections between the armature windings of said devices whereby an electromotive force is induced in the field winding of said second device upon angular disagreement of said objects, an electric motor for driving said driven object, a source of power supply for said motor, a relay device including two coils, one of said coils being rotatably mounted, electrical connections between one of said coils and said supply source, and electrical connections between the other of said coils and the field winding of said second device whereby said rotatably mounted coil is moved by electromagnetic repulsion when a voltage is induced in the field winding of said second device, and an operating connection between said rotatable coil and said contact arm.

In witness whereof, I have hereunto set my hand this 7th day of June, 1927.

EDWIN J. MURPHY.